Sept. 27, 1966  S. ROSIN  3,274,886
CASSEGRAIN TELE-OBJECTIVE
Filed Aug. 21, 1962  2 Sheets-Sheet 1

INVENTOR.
Seymour Rosin
BY
Michael S. Striker

Sept. 27, 1966 S. ROSIN 3,274,886
CASSEGRAIN TELE-OBJECTIVE
Filed Aug. 21, 1962 2 Sheets-Sheet 2

INVENTOR.
Seymour Rosin
BY
Michael S. Striker
Atty

United States Patent Office 3,274,886
Patented Sept. 27, 1966

3,274,886
CASSEGRAIN TELE-OBJECTIVE
Seymour Rosin, Massapequa Park, N.Y., assignor to Scanoptic Incorporated, New York, N.Y.
Filed Aug. 21, 1962, Ser. No. 218,319
17 Claims. (Cl. 88—57)

The present invention reates to a Cassegrain tele-objective and more particularly to a tele-objective of this type comprising a parabolic primary mirror and an exactly spherical secondary mirror.

It is one object of the present invention to provide a tele-objective in which all aberrations are corrected to a high degree.

Another object of the invention is to provide a Cassegrain tele-objective comprising mirrors which can be inexpensively manufactured to exact specifications.

Another object of the invention is to provide a tele-objective which is corrected over a wide color range and has a desired flatness of field.

Another object of the invention is to provide a tele-objective which consists of simple components.

With these objects in view, a tele-objective according to one embodiment of the invention comprises a primary mirror having a parabolic reflecting surface concave to the front and being formed with a central aperture, a secondary mirror having an exactly spherical reflecting surface convex to the rear, and lens means located between the mirrors and having zero power.

The radius of the entire spherical reflecting surface of the secondary mirror is equal to the radius of curvature of the central portion of the parabolic reflecting surface of the primary mirror, so that the primary and the secondary mirrors have the same focal length.

The distance between the reflecting surfaces of the mirrors is selected to be such that the image plane is located rearwardly of the primary mirror.

Parallel rays impinging the reflecting surface of the primary mirror are reflected toward the reflecting surface of the secondary mirror and pass from there through the lens means and the aperture in the primary mirror toward the image plane.

Due to the fact that the lens means have zero power, an adjustment of the lens means along the optical axis of the system has no influence on the location of the image plane. However, due to the variation of the distance between the lens means and the spherical surface, the circle of confusion in the image plane can be reduced to a minimum which is due to the fact that the aberrations can be fully corrected by suitably selecting this distance.

In the preferred embodiment of the invention, the lens means comprises a pair of lens elements. The algebraic sum of the curvatures of the surfaces of the lens elements is substantially equal to zero. Since the primary and secondary mirors have the same radius, the Petzval condition is fulfilled and flatness of field is achieved.

A wide spectral range results from the fact that all of the convergence is in the reflective mirrors, and the zero power lens means, which is made of two opposing lens elements of the same material, naturally cancels the color effects over a wide spectral range.

Three degrees of freedom are available for correcting spherical aberrations, coma and astigmatism namely, the bending of each of the two lens elements of the zero power lens means, and the selection of a suitable distance between the lens means and the secondary mirror. These three degrees of freedom are sufficient for correcting the aberrations produced with an exactly spherical surface of the secondary mirror.

In the preferred embodiment of the invention, the zero power lens means can be adjusted along the optical axis of the system, so that the circle of confusion can be reduced to a minimum by a person observing the image plane through a microscope.

In accordance with another aspect of the invention, the tele-objective is combined with a television camera and a monitor television receiver to form a telescopic apparatus which is advantageously used for star tracking operations. The mosaic plate of the television camera is located in the image plane of the tele-objective according to the present invention so that the monitor receiver produces a picture of the object reflected by the primary and secondary mirrors of the tele-objective.

The novel features which are considered as characteristic for the invention are set forth in particular in the appended claims. The invention itself, however, both as to its constuction and its method of operation, together with additional objects and advantages thereof, will be best understood from the following description of specific embodiments when read in connection with the accompanying drawings, in which:

Figure 1:
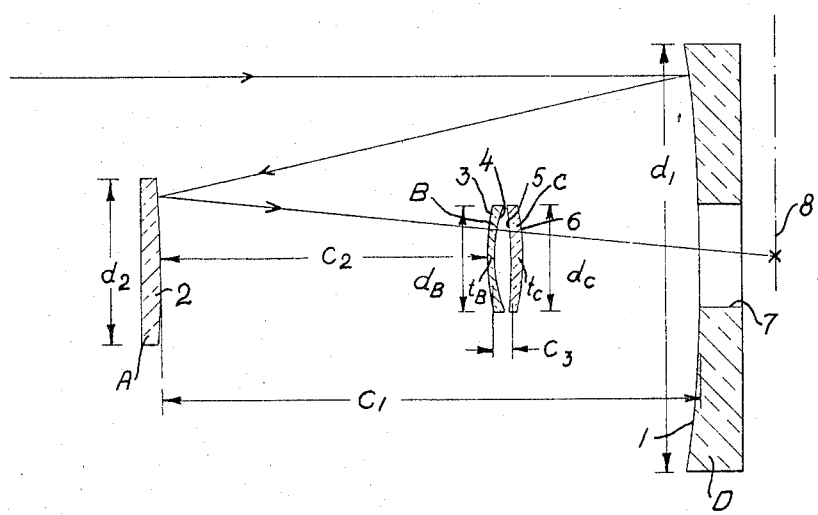
FIG. 1 is a schematic side view of a tele-objective according to one embodiment of the invention.

Referring now to the drawings, and more particularly to FIG. 1, a primary mirror D has a parabolic reflecting surface 1 concave to the front and having a diameter $d_1$. An aperture 7 is provided at the center of the primary mirror D.

A secondary mirror A has a reflecting surface 2 which is convex to the rear and exactly spherical throughout its entire area. The diameter $d_2$ of the spherical secondary mirror A is smaller than the diameter $d_1$ of the primary parabolic mirror D. Mirrors A and D are circular and aligned along the optical axis of the system. The separation between the reflecting surfaces 1 and 2 is $c_1$.

The radius of the spherical surface 2 is equal to the radius of curvature of the central portion of the parabolic reflecting surface 1 so that mirrors A and D have the same focal length.

The distance between reflecting surfaces 1 and 2 is greater than half the focal length of each mirror so that the image plane 8 is located rearwardly of the primary mirror D and outwardly of the air space between the reflecting surfaces 1 and 2. Consequently, parallel rays reflected by the parabolic surface 1 toward the spherical surface 2 are reflected by the same to pass through the aperture 7 and to form an image in the image plane 8.

In the preferred embodiment the image plane is located a short distance behind the primary mirror and the separation $c_1$ is greater than 55% and less than 63% of the focal length of the primary mirror or of the secondary mirror, the mirrors A and D having the same focal length. This relation may be mathematically expressed as follows:

$$0.63f > c_1 > 0.55f$$

wherein $c_1$ is the separation or air space between the reflecting surfaces 1 and 2, and $f$ is the focal length of mirror A.

As the distance $c_1$ between the mirrors is increased, the final focal plane is pulled inwards. With $c_1$ small, the focal plane is far to the rear. Between $0.55f$ and $0.63f$, the focal plane is in the preferred position, and for greater than $0.63f$ it is in the space between the mirrors.

In the event that the focal plane is moved further out from the primary mirror D, the diameter of the secondary mirror A would have to be increased to such an extent that vignetting would take place due to the fact that the secondary mirror A would block out the parallel rays coming from the source of rays to the reflecting face 1 of the primary mirror D.

Lens means including two lens elements B and C are located between the reflecting surfaces 1 and 2 along the optical axis of the system. Lens element B has two air surfaces 3 and 4 concave to the rear, and lens element C has two air surfaces 5 and 6 convex to the rear. Lens element B has a thickness $t_B$ and lens element C has a thickness $t_C$. The diameters $d_B$ and $d_C$ of the lens elements are equal. The lens elements B and C are separated by an air space $c_3$. The air space or separation between the reflecting surfaces 2 and 3 is $c_2$. Lens elements B and C are made of materials having substantially the same index of refraction. In a preferred embodiment quartz is used, but calcium fluoride or lithium fluoride would also be suitable. These materials have particularly good characteristics and are transparent within a range from deep ultraviolet to deep infrared, and consequently preferable to glass.

The curvatures of surfaces 3, 4, 5 and 6 are selected and calculated so that the algebraic sum of the curvatures is zero or nearly zero power, whereby the lens means B, C has zero power or nearly zero power.

A tele-objective according to one embodiment of the invention is constructed substantially according to the specifications in the following table:

| Elements | Surfaces | Radius | Thicknesses $t$ and Separations $c$ | Index of Refraction | Diameters $d$ |
|---|---|---|---|---|---|
| D | 1 | −348.8 | | 1 | $d_1=84$ |
| A | 2 | −348.8 | $c_1=-104.6$ | −1 | $d_2=32$ |
| | 3 | 50.211 | $c_2=63.274$ | 1 | |
| B | 4 | 28.640 | $t_B=1.5$ | 1.468179 | $d_B=20$ |
| | 5 | −141.66 | $c_3=3.0$ | 1 | |
| C | 6 | −45.333 | $t_C=3.0$ | 1.468179 | $d_C=20$ |

In the above table the radii, thicknesses, separations and diameters are given in millimeters. The index of refraction is for a wave length of 4200 Angstroms. For a wave length of 5000 Angstroms, the index of refraction would be 1.462394 and for a wave length of 3400 Angstroms, the index of refraction would be 1.478770.

A tele-objective constructed in accordance with the above table, has an effective focal length of 293.66 mm., a back focal length of 39.106 mm., a relative aperture of 1:3.67, and an angle of field of 2 degrees 30 minutes.

If the example is based on an effective focal length of 1.000, the following table is obtained:

| Element | Surface | Radius | Thicknesses $t$ and Separations $c$ | Index of Refraction | Diameter $d$ |
|---|---|---|---|---|---|
| D | 1 | −1.1878 | | 1 | $d_1=.28605$ |
| A | 2 | −1.1878 | $c_1=-.35619$ | −1 | $d_2=.10897$ |
| | 3 | .17098 | $c_2=.21547$ | 1 | |
| B | 4 | .09753 | $t_B=.00511$ | 1.46818 | $d_B=.0681$ |
| | 5 | −.48239 | $c_3=.01022$ | 1 | |
| C | 6 | −.15437 | $t_C=.01022$ | 1.46818 | $d_C=.0681$ |

The above example is illustrative for objectives according to the present invention.

Since the reflecting surfaces 1 and 2 have the same radius, and since the curvatures of the surfaces 3, 4, 5 and 6 of the lens elements B and C add to zero, the Petzval condition is fulfilled, and flatness of field is achieved. A wide spectral range results from the fact that all of the convergence is in the reflective elements, and the two opposing lens elements consisting of the same material cancel the color effects over a wide spectral range.

Spherical aberration, coma, and astigmatism are corrected by the bending of each of the lens elements B and C, and by suitably selecting the distance of the lens means B, C from the reflecting surface 2 of the secondary mirror A. Since three degrees of freedom are available, full corrections of the aberrations is achieved.

Figure 2:
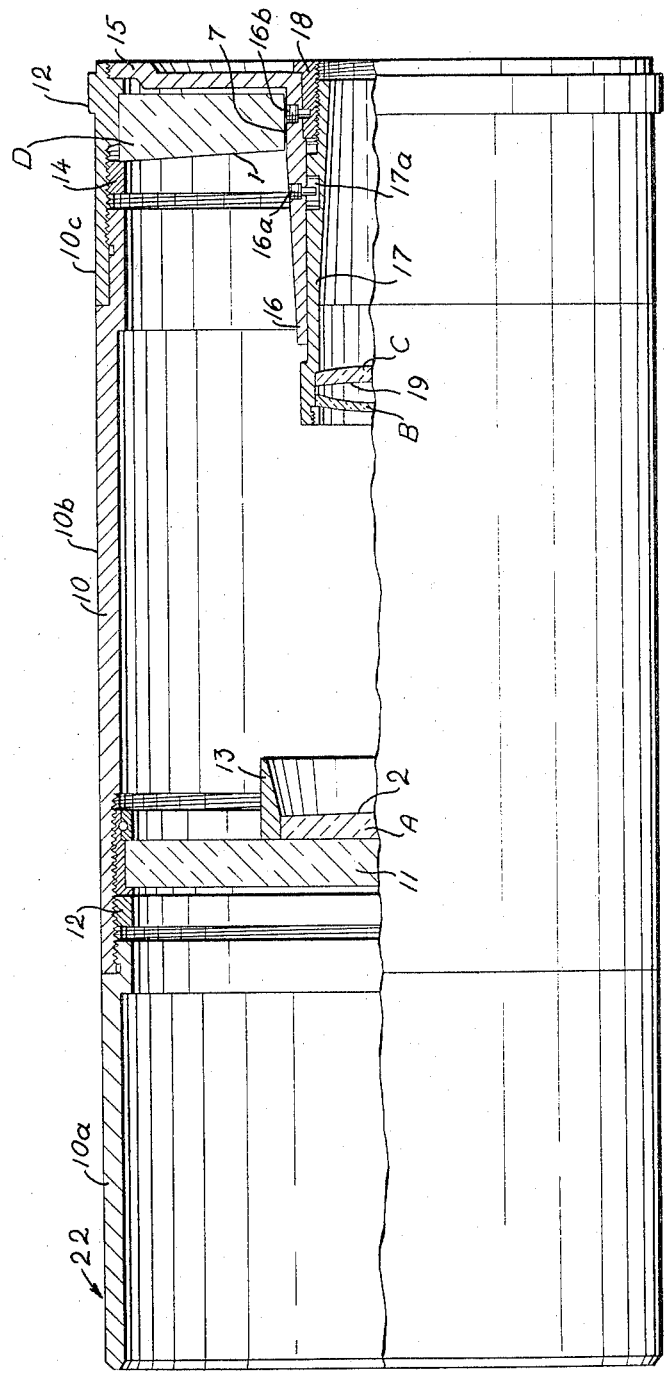
FIG. 2 is a side view, partially in axial section illustrating a tele-objective according to a preferred embodiment of the invention.

Due to the fact that the lens means B, C has zero power, the rays are not focused by the same, and it is possible to slightly shift the lens means B, c in the direction of the optical axis without influencing the position of the image plane 8. In this manner, the separation $c_2$ which influences the perfect correction of the aberrations can be further adjusted, and consequently the lens means B, C is mounted for movement in axial direction in a practical construction of the tele-objective of the present invention which will now be described with reference to FIG. 2.

Three tubular pieces 10a, 10b, 10c are connected by screw thread to form a tubular member 10. Mounting means 12, including three annular members are threaded into the front end of the tubular piece 10b and support a transparent circular member 11. The position of the transparent member 11 can be adjusted. A spherical mirror A is mounted in a mounting ring 13 and cemented to the transparent member 11, so that the position of the spherical surface 2 is adjusted when the transparent member 11 is adjusted in the tubular member 10.

A circular parabolic mirror D having a reflecting surface 1 is mounted at the rear end of tubular member 10 between a threaded ring 14 and the tubular part 10c. A guide means 15 having a collar 16 is threaded into a threaded portion of tubular part 10c so that collar 16 projects through the aperture 7 in the parabolic mirror D. Two pins 16a, 16b are secured to collar 16 and project into the interior of the same. A mounting tube 17 is mounted in collar 16 for sliding movement, and has an axially extending slot 17a into which pin 16a projects so that the mounting tube 17 cannot turn. An annular manually operated member 18 is located between collar 16 and mounting tube 17 and has an inner thread meshing with a thread on mounting tube 17. Pin 16b projects into a circular peripheral slot in the annular member 18 so that the same can be turned, but not moved in axial direction. Manual turning of member 18 will effect axial movement of mounting tube 17 due to the threaded engagement between parts 17 and 18.

At the forward end of mounting tube 17, lens means 19 is mounted which includes the two lens elements B and C.

The optical system is constructed as explained with reference to FIG. 1 so that the image plane is located rearwardly of the parabolic mirror D, and of the rear end of tubular member 10.

As explained above, the separation between reflecting surface 2 and lens means 19, as well as the curvatures of lens means 19 are calculated so that the aberrations are corrected. However, the correction can be influenced by adjusting the axial position of lens means 19 and by thus varying the separation between lens means 19 and reflecting surface 2.

For this purpose a microscope is focused on the image plane, and a point shaped image is observed while annular member 18 is turned to adjust the axial position of lens element 19. When the circle of confusion is a minimum, all aberrations are fully corrected.

Figure 3:
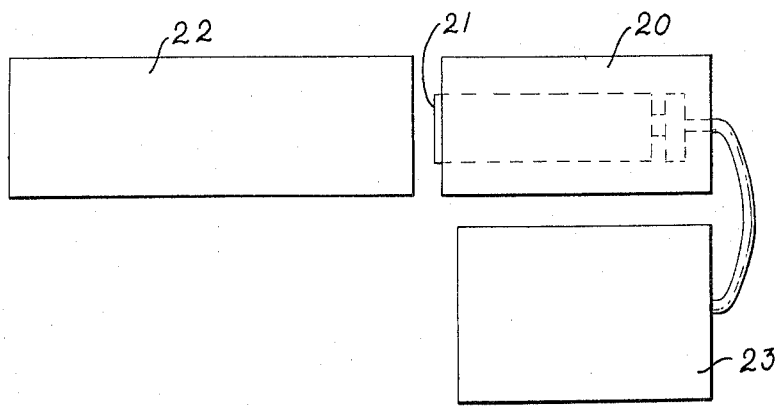
FIG. 3 is a diagrammatic view illustrating a telescopic apparatus according to one embodiment of the invention.

The tele-objective according to the present invention is advantageously used in the telescopic apparatus shown in FIG. 3. A television camera 20 is placed in a position in which its mosaic plate 21 is located in the image plane of a tele-objective 22 which is illustrated in detail in FIG. 2. A monitor television receiver 23 is electrically connected to the television camera 20 and has a screen on which the image on the mosaic plate 21 appears. Consequently, an object at which the tele-objective 22 is directed, for example a star, or satellite, can be observed on the screen of the television camera 23.

An adjustment of the position of the lens means 19 will have no influence on the position of the image plane, since lens means 19 has zero power. In any optical system the sensitivity of position for abberation stability is roughly proportional to the amount of spherical aberration at a location where the beam diameter is large. Since the primary parabolic mirror provided in the construction of the present invention has no spherical aberration, the position of the secondary mirror is relatively insensitive and the mounting of the secondary mirror A is not critical. The system is also relatively insensitive to the location of the image plane, since the secondary magnification is only 1.67, much lower than in other Cassegrain systems. The secondary mirror A is spherical over the entire reflecting surface thereof, which is a very important constructional feature from the standpoint of manufacture since a spherical secondary mirror is much easier to produce than any other shape and its concentration is much less critical.

It will be understood that each of the elements described above, or two or more together, may also find a useful application in other types of tele-objectives differing from the types described above.

While the invention has been illustrated and described as embodied in a tele-objective including a secondary mirror of exactly spherical shape and a lens means of zero power, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A tele-objective comprising, in combination, a primary mirror having a parabolic reflecting surface concave to the front, and being formed with an aperture; a secondary mirror having a spherical reflecting surface convex to the rear and confronting said parabolic reflecting surface, said mirrors being aligned along an optical axis, the diameter of said secondary mirror being smaller than the diameter of said primary mirror; the radius of the entire spherical reflecting surface being equal to the radius of curvature of the central portion of said parabolic reflecting surface so that said primary and secondary mirrors have the same focal length, the distance between said reflecting surfaces being greater than half of said focal length so that the image plane is located rearwardly of said primary mirror and outwardly of the air space between said mirrors whereby rays pass through said aperture; and lens means including at least two lens elements located between said mirrors concentric with said optical axis and together having zero power, the distance between said lens means and said spherical surface and the curvature of said lens elements being selected so that spherical aberration, coma and astigmatism are corrected.

2. A tele-objective comprising, in combination, a primary mirror having a parabolic reflecting surface concave to the front, and being formed with a central aperture; a secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface being equal to the radius of curvature of the central portion of said parabolic reflecting surface so that said primary and secondary mirrors have the same focal length, the distance between said reflecting surfaces being greater than half of said focal length so that the image plane is located rearwardly of said primary mirror and outwardly of the air space between said mirrors whereby rays pass through said aperture; lens means located between said mirrors concentric with said optical axis and including two lens elements, the total power of the surfaces of said lens elements being substantially equal to zero power, the distance between said lens means and said spherical surface, and the curvature of said lens elements being selected so that spherical aberration, coma and astigmatism are corrected; and means for mounting said lens means movable along said optical axis whereby the distance between said lens means and said spherical surface can be adjusted so that the circle of confusion is reduced to a minimum without changing the position of said image plane.

3. A tele-objective comprising, in combination, a primary mirror having a parabolic reflecting surface concave to the front, and being formed with a central aperture; a secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface being equal to the radius of curvature of the central portion of said parabolic reflecting surface so that said primary and secondary mirrors have the same focal length, the distance between said reflecting surfaces being between 0.55 and 0.63 of said focal length so that the image plane is located rearwardly of said primary mirror and outwardly of the air space between said mirrors whereby rays pass through said aperture; lens means located between said mirrors concentric with said optical axis and including two lens elements, the total power of the surfaces of said lens elements being substantially equal to zero power, the distance between said lens means and said spherical surface, and the curvature of said lens means being selected so that spherical aberration, coma and astigmatism are corrected; means for mounting said lens means movable along said optical axis whereby the distance between said lens means and said spherical surface can be adjusted so that the circle of confusion is reduced to a minimum without changing the position of said image plane; and manually operated adjusting means connected to said mounting means for moving said lens means along said optical axis.

4. A tele-objective comprising, in combination, a circular primary mirror having a parabolic reflecting surface concave to the front, and being formed with a central aperture; a circular secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface being equal to the radius of curvature of the central portion of said parabolic reflecting surface so that said primary and secondary mirrors have the same focal length, the distance between said reflecting surfaces being greater than half of said focal length so that the image plane is located rearwardly of said primary mirror and outwardly of the air space between said mirrors whereby rays pass through said aperture; and lens means located between said mirrors concentric with said optical axis, said lens means including two lens elements, the algebraic sum of the curvatures of the lens surfaces being substantially equal to zero, the distance between said lens means and said spherical surface, and the curvatures of said lens means being selected so that spherical aberration, coma and astigmatism are corrected.

5. A tele-objective comprising, in combination, a circular primary mirror having a parabolic reflecting surface concave to the front, and being formed with a central aperture; a circular secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface being equal to the radius of curvature of the central portion of said parabolic reflecting surface so that said primary and secondary mirrors have the same focal length, the distance between said reflecting surfaces being greater than half of said focal length so that the image plane is located rearwardly of said primary mirror and outwardly of the air space between said mirrors whereby rays pass through said aperture; lens means located between said mirrors concentric with said optical axis, said lens means including two lens elements, the algebraic sum of the curvatures of the lens surfaces being substantially equal to zero, the distance between said lens means and said spherical surface, and the curvatures of said lens means being selected so that spherical abberation, coma and astigmatism are corrected; and means for mounting said lens means movable along said optical axis whereby the distance between said lens means and said spherical surface can be adjusted so that the circle of confusion is reduced to a minimum without changing the position of said image plane.

6. A tele-objective comprising, in combination, a circular primary mirror having a parabolic reflecting surface concave to the front, and being formed with a central aperture; a circular secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface being equal to the radius of curvature of the central portion of said parabolic reflecting surface so that said primary and secondary mirrors have the same focal length, the distance between said reflecting surfaces being between 0.55 and 0.63 of said focal length so that the image plane is located rearwardly of said primary mirror and outwardly of the air space between said mirrors whereby rays pass through said aperture; lens means located between said mirrors concentric with said optical axis, said lens means including two lens elements, the algebraic sum of the curvatures of the lens surfaces being substantially equal to zero, the distance between said lens means and said spherical surface, and the curvatures of said lens means, being selected so that spherical aberration, coma and astigmatism are corrected; means for mounting said lens means movable along said optical axis whereby the distance between said lens means and said spherical surface can be adjusted so that the circle of confusion is reduced to a minimum without changing the position of said image plane.

7. A tele-objective comprising, in combination, a circular primary mirror having a parabolic reflecting surface concave to the front and being formed with a central aperture; a circular secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface being equal to the radius of curvature of the central portion of said parabolic reflecting surface so that said primary and secondary mirrors have the same focal length, the distance between said reflecting surfaces being greater than half of said focal length so that the image plane is located rearwardly of said primary mirror and outwardly of the air space between said mirrors whereby rays pass through said aperture; and lens means located between said mirrors concentric with said optical axis, said lens means including two lens elements, said lens elements having substantially the same index of refraction, the algebraic sum of the curvatures of the lens surfaces being substantially equal to zero, the distance between said lens means and said spherical surface, and the curvatures of said lens means being selected so that spherical aberration, coma and astigmatism are corrected.

8. A tele-objective as set forth in claim 7 wherein said lens elements consist of quartz.

9. A tele-objective as set forth in claim 7 wherein at least one of said lens elements consists of calcium fluoride.

10. A tele-objective as set forth in claim 7 wherein at least one of said lens elements consists of lithium fluoride.

11. A telescopic apparatus comprising, in combination, a primary mirror having a parabolic reflecting surface concave to the front, and being formed with a central aperture; a secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface portion of said parabolic reflecting surface so that said primary and secondary mirrors have the same focal length, the distance between said reflecting surfaces being greater than half of said focal length so that the image plane is located rearwardly of said primary mirror and outwardly of the air space between said mirrors whereby rays pass through said aperture; lens means located between said mirrors concentric with said optical axis and including two lens elements, the total power of the surfaces of said lens elements being substantially equal to zero power, the distance between said lens means and said spherical surface, and the curvature of said lens elements being selected so that spherical aberration, coma and astigmatism are corrected; a television camera having a mosaic plate located in said image plane; and monitor television receiver means electrically connected to said television camera and having means for reproducing the image formed on said mosaic plate of an object reflected by said primary and secondary mirrors.

12. A telescopic apparatus, comprising, in combination, a circular primary mirror having a parabolic reflecting surface concave to the front, and being formed with a central aperture; a circular secondary mirror having an exactly spherical reflecting surface convex to the rear and confronting said parabolic reflecting surface, said mirrors being aligned along an optical axis, the diameter of said secondary mirror being smaller than the diameter of said primary mirror, the radius of the entire spherical reflecting surface being equal to the radius of curvature of the central portion of said parabolic reflecting surface so that said primary and secondary mirrors have the same focal length, the distance between said reflecting surfaces being greater than half of said focal length so that the image plane is located rearwardly of said primary mirror and outwardly of the air space between said mirrors whereby rays pass through said aperture; lens means located between said mirrors concentric with said optical axis, said lens means including two lens elements, said lens elements having substantially the same index of refraction, the algebraic sum of the curvatures of the lens surfaces being substantially equal to zero, the distance between said lens means and said spherical surface, and the curvatures of said lens means being selected so that spherical aberration, coma and astigmatism are corrected; means for mounting said lens means movable along said optical axis whereby the distance between said lens means and said spherical surface can be adjusted so that the circle of confusion is reduced to a minimum without changing the position of said image plane; a television camera having a mosaic plate located in said image plane; and monitor television receiver means electrically connected to said television camera and having means for reproducing the image formed on said mosaic plate of an object reflected by said primary and secondary mirrors.

13. A tele-objective comprising, in combination, a tubular member having an axis; a circular primary mirror mounted at one end of said tubular member and having a parabolic reflecting surface concave toward the other end of said tubular member, and being formed with a central aperture; a transparent support mounted in the region of the other end of said tubular member; a circular secondary mirror attached to said transparent support and located between the same and said primary mirror, said secondary mirror having an exactly spherical reflecting surface convex toward and confronting said parabolic reflecting surface, said mirrors being aligned along the axis of said tubular member, said transparent support, said primary mirror and said tubular member having substantially the same diameter, and said secondary mirror having a substantially smaller diameter so that light passes through the outer portion of said transparent member toward said parabolic reflecting surface, the radius of the entire spherical reflecting surface being equal to the radius of curvature of the central portion of said parabolic reflecting surface so that said primary and secondary mirrors have the same focal length, the distance between said reflecting surfaces being more than half said focal length so that the image plane is located outwardly of said tubular member; a guide means mounted at said one end of said tubular member and having a collar projecting through said central aperture into said tubular member; a mounting tube supported in said collar of said guide means for sliding movement in axial direction; lens means mounted in said collar and being located between said mirrors concentric with said axis, said lens means including two lens elements, the total power of the surfaces of said lens elements being substantially equal to zero power; and manually operated means connected to said mounting tube for moving the same with said lens means along said axis whereby the distance between said lens means and said spherical surface can be adjusted so that the circle of confusion in said image plane is reduced to a minimum.

14. A tele-objective as set forth in claim 13 wherein said mounting tube is non-turnably mounted in said collar; wherein said manually operated means is an annular member mounted in said collar non-movable in axial direction, and turnable, said annular member surrounding said mounting tube and being in threaded engagement with the same so that turning of said annular member effects adjustment of said mounting tube and lens means in axial direction.

15. A tele-objective as set forth in claim 13 and including an adjustable mounting ring supporting said transparent support with said secondary mirror in said tubular member for adjustment in axial direction of said tubular member whereby the image can be focussed in a selected image plane.

16. A tele-objective constructed substantially according to the specifications in the following table:

| Element | Radius | Thicknesses $t$ and Separations $c$ | Index of Refraction | Diameter $d$ |
|---|---|---|---|---|
| D | $-1.1878f$ | | 1 | $d_1 = .28605f$ |
|  |  | $c_1 = -.35619f$ | $-1$ |  |
| A | $-1.1878f$ |  | | $d_2 = .10897f$ |
|  |  | $c_2 = .21547f$ | 1 |  |
|  | $.17098f$ |  | |  |
| B |  | $t_B = .00511f$ | 1.46818 | $d_B = .0681f$ |
|  | $.09753f$ |  | |  |
|  |  | $c_3 = .01022f$ | 1 |  |
| C | $-.48239f$ | $t_C = .01022f$ | 1.46818 | $d_C = .0681f$ |
|  | $-.15437f$ |  | |  | wherein said elements are designated by the characters A, B, C, D and have thicknesses $t$, diameters $d$ and reflecting surfaces spaced air spaces $c$, wherein $c_1$, $c_2$, and $c_3$ designate the air spaces betwen elements D and A, A and B, and B and C, respectively, and $t_B$ and $t_C$ designate the thicknesses of the elements B and C, wherein $d_1$, $d_2$, $d_B$, and $D_C$ designate the diameters of the elements D, A, B, and C, respectively, wherein $f$ designates the effective focal length of the objective, wherein the elements listed in the first column are arranged in alphabetical order from the front to the rear, wherein the second column lists the radii of the surfaces of said elements in the order in which the surfaces are impinged by rays of light, wherein the minus signs in the second column indicate surfaces concave to the front, wherein the minus sign in the third and fourth columns indicate the passage of rays from the rear to the front, and wherein the index of refraction is given for a wavelength of 4200 Angstroms.

17. A tele-objective constructed substantially according to the specifications in the following table:

| Element | Radius | Thicknesses $t$ and Separations $c$ | Index of Refraction | Diameters $d$ |
|---|---|---|---|---|
| D | $-348.8$ |  | 1 | $d_1 = 84$ |
|  |  | $c_1 = -104.6$ | $-1$ |  |
| A | $-348.8$ |  |  | $d_2 = 32$ |
|  |  | $c_2 = 63.274$ | 1 |  |
|  | $50.211$ |  |  |  |
| B |  | $t_B = 1.5$ | 1.468179 | $d_B = 20$ |
|  | $28.640$ |  |  |  |
|  |  | $c_3 = 3.0$ | 1 |  |
| C | $-141.66$ | $t_C = 3.0$ | 1.468179 | $d_B = 20$ |
|  | $-45.333$ |  |  |  | wherein said elements are designated by the characters A, B, C, D, and have thicknesses $t$, diameters $d$ and reflecting surfaces spaced air spaces $c$, wherein $c_1$, $c_2$, and $c_3$ designate the air spaces between elements D and A, A and B, and B and C, respectively, and $t_B$ and $t_C$ designate the thicknesses of the elements B and C, wherein $d_1$, $d_2$, $d_B$, and $D_C$ designate the diameters of the elements D, A, B, and C, respectively, wherein the dimensions are mm., wherein the elements listed in the first column are arranged in alphabetical order from the front to the rear, wherein the second column lists the radii of the surfaces of the elements in the order in which the surfaces are by rays of light, wherein the minus signs in the second column indicate surfaces concave to the front, wherein the minus signs in the third and fourth column indicate passage of rays from the rear to the front, wherein the index of refraction is for a wave length of 4200 Angstroms, and wherein the effective focal length is 293.66 mm., the back focal length is 49.106 mm., and the angle of field is 2° 30′.

References Cited by the Examiner

UNITED STATES PATENTS 2,429,462  10/1947  Henroteau _____ 88—57 X
2,537,912  1/1951  Reiss _____ 88—57

FOREIGN PATENTS 852,302  10/1960  Great Britain.

OTHER REFERENCES

Wynne: "Field Correctors for Parabolic Mirrors," Proceedings of The Physical Society of London, 1949, section B, volume 62, pp. 772–787.

JEWELL H. PEDERSEN, *Primary Examiner.*

DAVID H. RUBIN, *Examiner.*

J. K. CORBIN, *Assistant Examiner.*